United States Patent [19]
Toyama et al.

[11] Patent Number: 5,889,505
[45] Date of Patent: Mar. 30, 1999

[54] VISION-BASED SIX-DEGREE-OF-FREEDOM COMPUTER INPUT DEVICE

[75] Inventors: Kentaro Toyama, Miami, Fla.; Gregory Donald Hager, New Haven, Conn.

[73] Assignee: Yale University, New Haven, Conn.

[21] Appl. No.: 810,269

[22] Filed: Mar. 3, 1997

Related U.S. Application Data

[60] Provisional application No. 60/012,761 Mar. 4, 1996.
[51] Int. Cl.$^6$ .............................. G09G 5/00; G05B 15/00; G06K 9/36
[52] U.S. Cl. .......................... 345/156; 345/157; 345/158; 382/276; 348/135; 348/139; 348/169; 395/94
[58] Field of Search ..................................... 345/156, 157, 345/158, 167; 382/276, 287, 289, 291; 348/135, 139, 141, 169, 172; 395/94; 73/862.043

[56] References Cited

U.S. PATENT DOCUMENTS

| | | | |
|---|---|---|---|
| 4,811,608 | 3/1989 | Hilton | 73/862.043 |
| 4,891,630 | 1/1990 | Friedman et al. | 345/156 |
| 5,146,566 | 9/1992 | Hollis et al. | 395/893 |
| 5,222,400 | 6/1993 | Hilton | 73/862.043 |
| 5,297,061 | 3/1994 | Dementhon | 345/156 X |
| 5,335,557 | 8/1994 | Yasutake | 73/862.043 |
| 5,579,444 | 11/1996 | Dalziel et al. | 395/94 |
| 5,587,929 | 12/1996 | League et al. | 364/516 |
| 5,703,961 | 12/1997 | Rogina et al. | 382/276 X |
| 5,802,220 | 9/1998 | Black et al. | 382/276 |
| 5,809,161 | 9/1998 | Auty et al. | 382/104 |

*Primary Examiner*—Steven J. Saras
*Assistant Examiner*—Seth D. Vail
*Attorney, Agent, or Firm*—Ohlandt, Greeley, Ruggiero & Perle

[57] ABSTRACT

A vision-based controller provides translational and rotational control signals to a computer or other input driven device. The controller includes a tracked object, positioned in space and having at least a first reference point and a second reference point. The tracked object is capable of three dimensional rotational and translational movement. At least one imaging device, positioned at a distance from the tracked object, generates an image of the tracked object, at plural succeeding times. A processor unit receives the image, comprised of pixel values, from the imaging device; identifies pixels corresponding to a current center of the tracked object, the first reference point and the second reference point; determines a current dimension (i.e., size or radius) of the tracked object; calculates a translational and rotational displacement of the tracked object based on the above information; and generates control signals in accordance with the transitional and rotational displacement.

18 Claims, 4 Drawing Sheets

VISION-BASED SIX-DEGREE-OF-FREEDOM COMPUTER INPUT DEVICE

This application claims the priority from U.S. Provisional Application No. 60/012,761 filed Mar. 4, 1996.

FIELD OF THE INVENTION

The present invention relates to an input control device for a computer that is capable of providing input of up to six degrees of freedom (6DoF) and, more particularly, to a vision-based input device which allows a user to control movement of a real or virtual object in any three dimensional (3D) environment.

BACKGROUND OF THE INVENTION

With the rapid advancement of virtual reality environments which allow fully three-dimensional simulation of a virtual world, there is an increasing need for input devices which allow intuitive control of dimensions beyond the two-dimensional (2D) controls currently offered by a mouse, trackball or joystick.

It is well known that some input devices currently provide three-dimensional (3D) inputs of up to six degrees of freedom (6DoF). That is to say, 3D/6DoF devices enable translational control along the conventional three axes (i.e., X-axis, Y-axis and Z-axis) and rotational control about each of the three axes, commonly referred to as roll, pitch and yaw. These devices currently utilize magnetic, acoustic, infrared and mechanical methods to achieve 3D/6DoF tracking. 3D/6DoF controllers employing mechanical methods are typically utilized in the operation of heavy equipment. These devices must be rugged, accurate and immune from the effects of noise. Accordingly input control devices used for interactive graphics are not suitable for use in field applications. As a result, heavy equipment controllers typically consist of an array of heavy-but-reliable levers which have little if any intuitive relationship to the functions being performed. Such controllers present a non-intuitive user interface and require significant mental agility and experience to operate.

Another type of input control device is found in U.S. Pat. No. 5,146,566 (Hollis et al.) which provides an I/O system for a computer user interface using magnetic levitation. Such a system includes a magnetic levitation device having a matched electrodynamically levitated movable element (referred to as a "flotor") and stator, and an electrodynamic forcer mechanism for receiving coil currents for applying controlled magnetic forces mutual to the flotor and stator. A processor unit, in conjunction with control software, measures the relative movement of the flotor-stator combination and controls the coil currents provided to the electrodynamic forcer mechanism. Magnetic levitation devices, however, are sensitive to electromagnetic interference and are far too expensive to be useful to the average computer owner.

Other 3D/6DoF controllers and systems have also been known to be based on touch or force sensitivity. Examples of such devices can be found in U.S. Pat. No. 5,335,557 (Yasutake) which utilizes forced-based pads to provide a touch sensitive 3D/6DoF input control device and U.S. Pat. No. 4,811,608 (Hilton) which discloses force and torque converters.

U.S. Pat. No. 5,222,400 (Hilton) discloses a force and torque-based 3D/6DoF input device which utilizes optical emitter/detectors (i.e., light emitting diodes and photodiodes). A user applying a force or torque (i.e., a user input) to the input device causes a shutter (i.e., a metal strip) to move. The moving shutter alters the extent to which the radiation of the LEDs can fall on the photodiode and, thus, alters the amount of current relayed to electrical circuitry that is coupled to the photodiodes. The translational and rotational displacement are then determined by measurement of altered current.

These types of force and torque input devices remain fixed to a base and provide 3D/6DoF input as forces and torques are applied to the device by the user. Some users, however, have found these controllers difficult to employ because the operation of such input devices actually involves very little user interaction and motion of the device. Such devices also do not provide direct positional information due to their force and torque-based characteristic.

There is a continuing need for input devices which provide more intuitive 3D/6DoF control using low cost equipment. Further, there is a desire to provide an alternative tracking method, other than those currently employed.

One possible alternative tracking method is vision-based (optical) tracking. Vision-based tracking techniques, however, have been unsuccessful in the past. This is tied to a three point problem which relates to the theory that three reference points are required to track an object in three dimensional space. The problems with vision-based techniques have also been associated with the poor resolution of digital video cameras and algorithms which are not capable of keeping pace with tracked points when the points move at sharp, irregular angles in a short period of time (i.e., lagging).

Accordingly, it is an object of the invention to provide a 3D/6DoF vision-based input device which is physically more compliant than existing devices, thereby allowing for more intuitive user control.

It is a further object of the invention to provide a 3D/6DoF input device which utilizes low cost equipment.

Another object of the invention is to provide a 3D/6DoF controller which can incorporate both velocity and position feedback without the need for force-sensing technology.

It is also an object of the invention to provide a simple 3D/6DoF input device for use with any computer equipped with a camera.

An additional object of the invention provides a 3D/6DoF input device which is insensitive to acoustic or electromagnetic noise.

Another object of the invention is to provide a 3D/6DoF input device which utilizes ordinary light as the tracking medium.

SUMMARY OF THE INVENTION

A vision-based controller provides translational and rotational control signals to a computer or other input driven device. The controller includes a tracked object, positioned in space and having at least a first reference point and a second reference point. The tracked object is capable of three dimensional rotational and translational movement. At least one imaging device, positioned at a distance from the tracked object, generates an image of the tracked object, at plural succeeding times. A processor unit receives the image, comprised of pixel values, from the imaging device; identifies pixels corresponding to a current center of the tracked object, the first reference point and the second reference point; determines a current dimension (i.e., size or radius) of the tracked object; calculates a translational and rotational displacement of the tracked object based on the above information; and generates control signals in accordance with the transitional and rotational displacement.

DETAILED DESCRIPTION OF THE INVENTION

Figure 1:
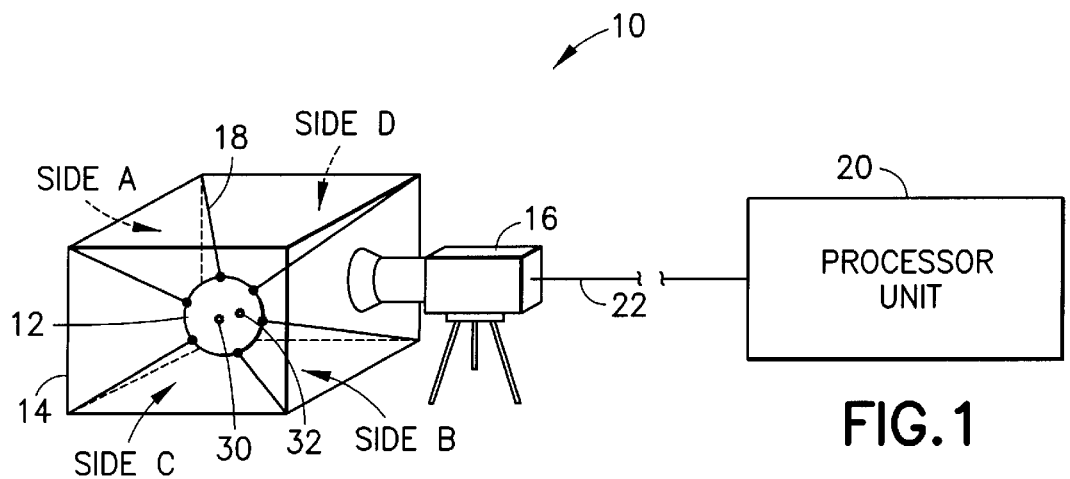
FIG. 1 is a system overview of an input device in accordance with the present invention.

Referring to FIG. 1, a vision-based input device (hereinafter VID) 10 includes a tracked object 12 and an object holder 14 for supporting tracked object 12 in a suspended position in space. An imaging device 16, positioned at a distance from tracked object 12, generates a current image of tracked object 12 comprising pixel values, at plural times. A processor 20 accesses the pixel values registered by imaging device 16 and, accordingly, generates control data corresponding to a translational and rotational displacement of tracked object 12.

Tracked object 12 is preferably a ball which includes thereon a first reference point 30 and a second reference point 32. Each reference point 30, 32 is provided with a distinguishing characteristic such as a different shape, size, color, . . . etc. Any type or set of markings of any size, shape or color can be employed to distinguish reference points 30, 32 as long as positional and rotational information can be deduced from a single view of tracked object 12. Similarly, tracked object 12 can be any type of object which is easily manipulated in all six degrees of freedom, such as a glove, a rod, a cube, . . . etc.

Object holder 14 is a box-shaped chamber having a hollow internal cavity encompassing tracked object 12 therein. Tracked object 12 is centrally positioned and suspended inside object holder 14 by a plurality of elastic bands 18 connected to object holder 14. Object holder 14 includes an opening on a side A which allows a user to reach into object holder 14 and comfortably grasp tracked object 12. Another opening is located on a side B, opposite to side A, which allows tracked object 12 to be viewed or scanned from a position external to object holder 14.

Elastic bands 18 are utilized to suspend tracked object 12 in space. The elastic nature of elastic bands 18 allows a user to pull or push tracked object 12 in all three translational directions to varying degrees, to twist tracked object 12 about all three rotational axes to varying degrees, and to move tracked object 12 in any superposition of these motions. Elastic bands 18 are also taut enough such that elastic bands 18 return tracked object 12 to its "home" position whenever the user ceases to apply a force or torque. The user is thus capable of experiencing forces and torques counter to each user applied force and torque. This allows for a more intuitive relationship between VID 10 and the function being performed by the user.

"Home position" hereinafter refers to when tracked object 12 is in a resting position (i.e., when no user force or torque is applied).

While not shown in FIG. 1, tracked object 12 may be suspended in space by mechanical devices, other than elastic bands 18 and object holder 14, such as ball-bearings and rollers (i.e., as with a trackball), springs . . . etc.

In the preferred embodiment of VID 10, tracked object 12 is preferably a monochromatic (i.e., uniformly gray) ball having a diameter of approximately 8 centimeters. Each reference point thereon is preferably represented by a different color dot (i.e., black and white) having a diameter of 8 millimeters and placed 10 millimeters apart. It is also preferred that object holder 14 has dimensions approximately 20 cm×20 cm×20 cm. However, it is important to understand that the shape, size and color of tracked object 12, the position and number of reference points, and the exact nature of the object holder and elastic bands can be altered without any loss of functionality of VID 10.

As shown in FIG. 1, imaging device 16 is secured in a position relative to object holder 14 such that its lens is aimed directly at tracked object 12 and reference points 30, 32 through the opening on side B of object holder 14. When tracked object 12 is in the home position, reference points 30, 32 are horizontally or vertically aligned with respect to imaging device 16 (i.e., its lens).

That is to say, imaging device 16 is positioned to generate visual images of tracked object 12 and reference points 30, 32. The image, comprised of pixel values, is transmitted to processor unit 20 over a transmission pathway 22. As understood by those skilled in the art, imaging device 16 can be configured to generate visual images at varying frequencies or periods (i.e., 30 frames/sec, 60 frames/sec . . . etc.).

It is preferred that imaging device 16 is a camera with a lens, aperture, position and orientation adjusted such that tracked object 12 is in focus and, in its home position, tracked object 12 occupies ¹⁄₂₅th of a camera image at the image center. Imaging device 16 can be either a digital camera whose pixel values are mapped to a host memory, or an analog camera whose output is digitized by a frame grabber. Note that while a monochromatic camera may be utilized, it is preferred that imaging device 16 is capable of producing color images.

Processor unit 20, coupled to imaging device 16, receives the pixel values, calculates a translational and rotational displacement of tracked object 12, based on the pixel values, and generates control data in accordance with the translational (X,Y and Z-axis) and rotational displacement (yaw, pitch and roll) values. Processor 20 can either be a central processing unit (CPU) of a computer or hardware in a complete input device system including tracked object 12 and imaging device 16. A memory media can be utilized in conjunction with processor 20 to provide the control functions in accordance with the present invention.

Figure 2:
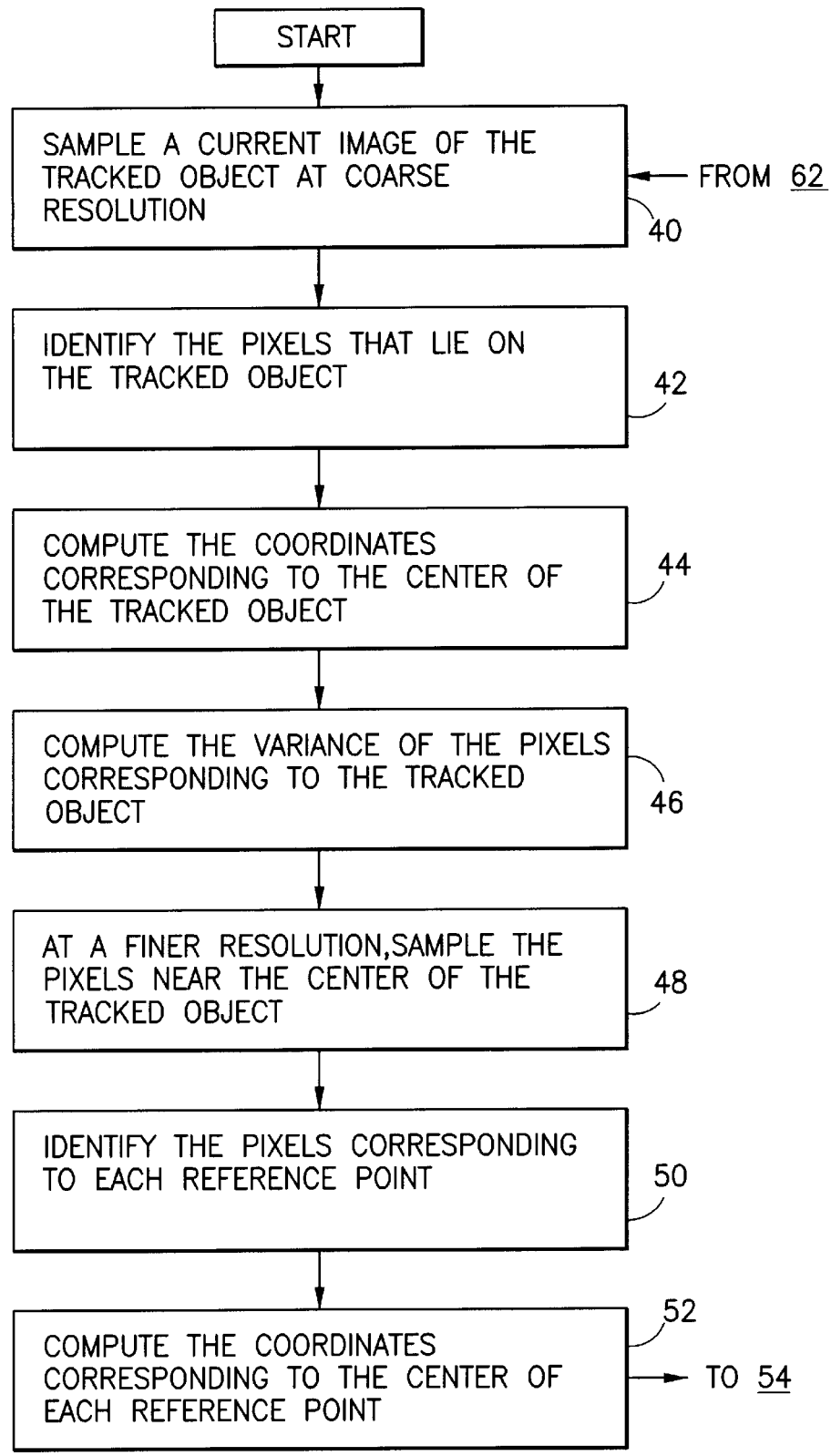
FIGS. 2 and 3 schematically illustrate a logic flow diagram of the operation of the input device.
Figure 3:
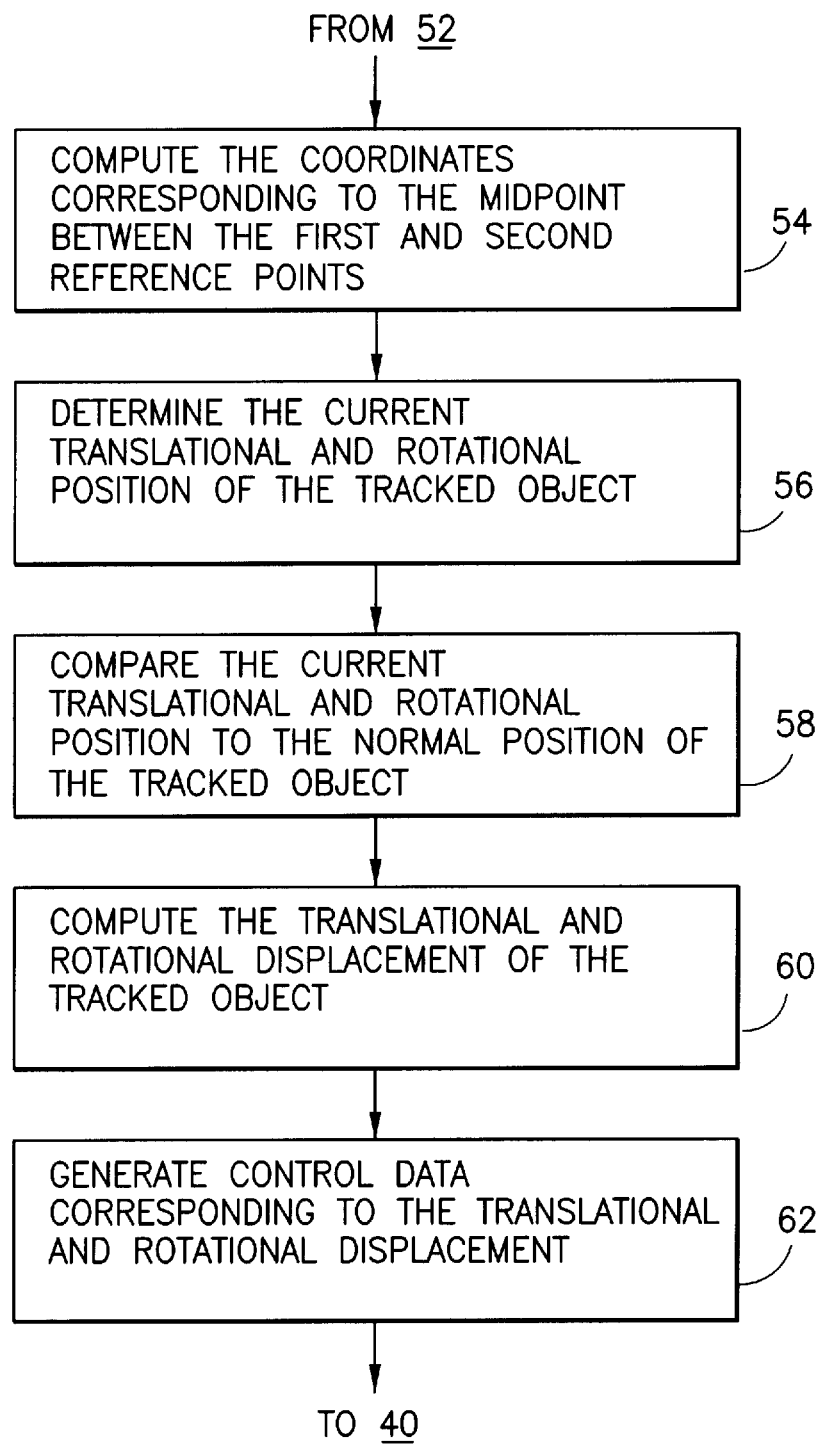

Turning now to FIGS. 2 and 3, the operation of the invention will be described. Initially, there is a download of translational and rotational data corresponding to a home position of tracked object 12. Such data can be either stored locally or generated during some initialization period.

Thereafter, processor unit 20 samples a current image (comprising pixel values) of tracked object 12 at a coarse resolution (Box 40) and identifies the pixels that lie on tracked object 12 (Box 42). Processor unit 20 determines the center of tracked object 12 by computing a mean of all the pixel coordinates corresponding to tracked object 12 (Box 44), using the following equations:

$$X_t = \Sigma X_i / N$$

$$Y_t = \Sigma Y_i / N$$

where:

$X_t$, $Y_t$ are the x and y-coordinates of the center of the tracked object.

$X_i$, $Y_i$ correspond to the x and y-coordinates of a pixel lying on the tracked object.

i is the set of all pixels lying on the tracked object.

N is the number of pixels lying on the tracked object.

Processor 20 then computes the variance of the pixels corresponding to tracked object 12 (Box 46). That is to say, processor 20 measures how far apart (i.e., spread out) the pixels are from the center of tracked object 12 ($X_t$, $Y_t$). The following equation is used to determine the variance:

$$V=\Sigma((X_i-X_t)^2+(Y_i-Y_t)^2)/N$$

where:

V is the variance (i.e., deviation).

$X_i$, $Y_i$ correspond to the x and y-coordinates of a pixel lying on the tracked object.

i is the set of all pixels corresponding to the tracked object.

$X_t$, $Y_t$ are the x and y-coordinates of the center of the tracked object.

N is the number of pixels lying on the tracked object.

It is important to understand that the variance provides a third reference, i.e., the size or radius of tracked object 12, for determining translational and rotation movements along the axis of imaging device 16 (e.g., the z-axis).

At a finer resolution, processor 20 then samples pixels near the center of tracked object 12 (Box 48) and identifies the pixels corresponding to reference points 30, 32 (Box 50). Using the same calculation methods as described above to determine the center of tracked object 12 ($X_t$, $Y_t$), processor 20 computes the coordinates corresponding to the center of first reference point 30 ($X_{r1}$, $Y_{r1}$) and second reference point 32 ($X_{r2}$, $Y_{r2}$) (Box 52). Processor 20 then calculates the midpoint between first reference point 30 and second reference point 32 ($X_c$, $Y_c$) by applying the following equation (Box 54):

$$X_c=(X_{r1}+X_{r2})/2$$

$$Y_c=(Y_{r1}+Y_{r2})/2$$

where:

$X_c$, $Y_c$ are the x and y-coordinates of the midpoint between the first and second reference points $X_{r1}$, $Y_{r1}$ is the x and y-coordinates of the first reference point.

$X_{r2}$, $Y_{r2}$ is the x and y-coordinated of the second reference point.

Thereafter, a current approximation of the translational and rotational displacement of tracked object 12 is computed by applying the above-information to commonly known geometric formulas as provided herein (Box 56):

$Z=K_1/SQRT(V)$ $X=K_2(X_t/Z)$ $Y=K_3(Y_t/Z)$ $T=K_4 a\sin(X_c-X_t)$ $PH=K_5 a\sin(Y_c-Y_t)$ $PS=K_6 a\tan 2(Y_{r1}-Y_{r2}, X_{r1}-X_{r2})$ where:

Z is a translational value along the z-axis (i.e., the imaging device axis).

X is a translational value along the x-axis (i.e., the left/right axis).

Y is a translational value along the y-axis (i.e., the up/down axis).

T is a rotational value about the Y-axis (i.e., yaw).

PH is a rotational value about the X-axis (i.e., pitch).

PS is a rotational value about the Z-axis (i.e., roll).

$K_1$ through $K_6$ are scaling constants used to compute the translational and rotational position.

V is the variance of the tracked object.

$X_t$, $Y_t$ are the x and y-coordinates of the center of the tracked object.

$X_{r1}$, $Y_{r1}$, are the x and y-coordinates of the first reference point.

$X_{r2}$, $Y_{r2}$ are the x and y-coordinates of the second reference point.

$X_c$, $Y_c$ are the x and y-coordinates of the midpoint between the first and second reference points.

SQRT is the square root function a sin is the arc sine function.

a tan 2 is the arc tangent function.

Processor 20 then compares the current translational and rotational data (Z,X,Y,T,PH and PS) to the initial translational and rotational data of tracked object 12 (i.e., in the normal position) (Box 58) and computes a current translational and rotational displacement of tracked object 12 (Box 60).

As can be appreciated by those skilled in the art, VID 10 utilizes visual images of tracked object 12 to provide the necessary three references, namely reference points 30, 32 and the dimensions of tracked object 12 (i.e., the variance), to track the three dimensional object. Other geometric formulas and approaches, than those described above, may be used to determine the translational and rotational position of tracked object 12 based on these three references.

Thereafter, processor 20 generates control data (i.e., an input event) corresponding to the translational and rotational displacement of tracked object 12 (Box 62). The control data can relate to either strict translational and rotational data or velocity data, depending on the application, i.e., a computer game, heavy equipment, computer graphics, . . . etc.

Instead of comparing current translational and rotational data to a set of initial data (i.e., normal position of tracked object 12) as described above, processor 20 can also compare current positional data to previously computed translational and rotational data. Such an arrangement can be implemented by simply storing each set of generated data and comparing it with a subsequent set of data.

It should also be noted that processor unit 20 can be configured to allow fine tuning of VID 10 for more or less sensitivity, smoothing to eliminate noise (e.g., jitter-proofing), elimination of non-required degrees of freedom (i.e., some applications may not need translational information), and so forth. Such an arrangement is well-known in the art and will not be described herein.

Figure 4A:
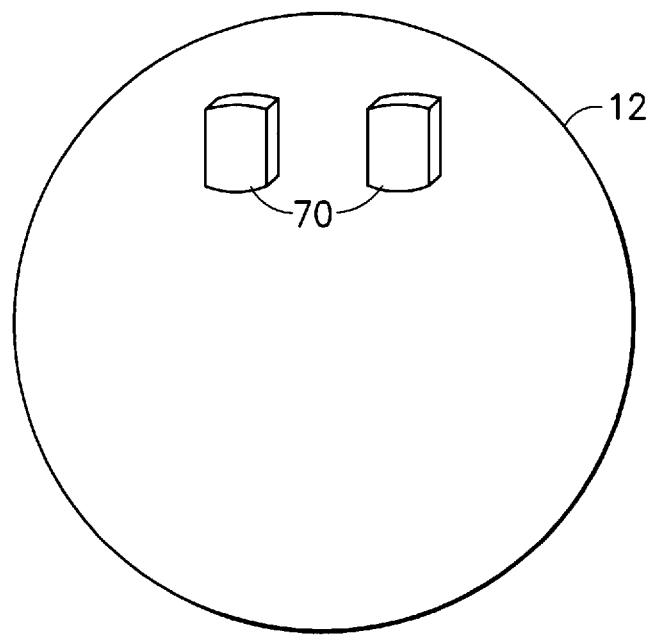
FIG. 4A illustrates a back view of a tracked object with an input mechanism.
Figure 4B:
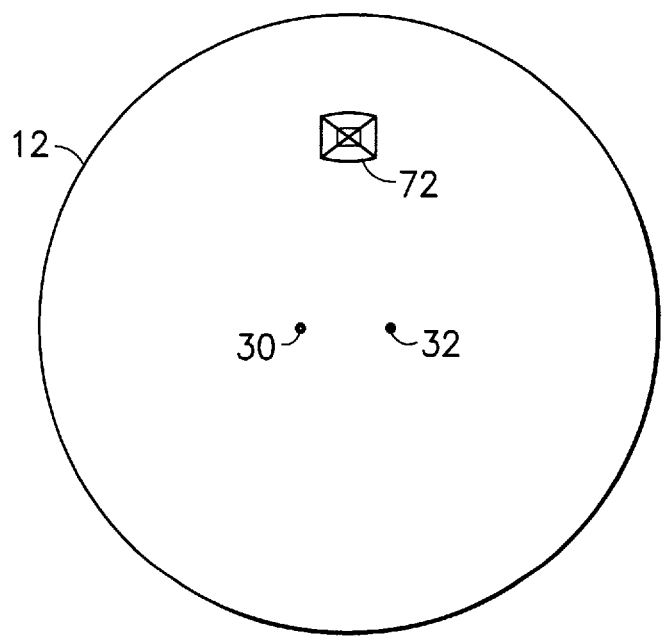
FIG. 4B illustrates a frontal view of a tracked object with an input mechanism.

In a second embodiment of VID 10, a user input mechanism can be incorporated into tracked object 12, as shown in FIG. 4. As with a mouse and joystick, buttons and other similar input mechanisms 70 can be added onto tracked object 12 to provide a binary input (i.e., "click" on) to processor unit 20. The binary input can be relayed to processor unit 20, either by a tethered communication pathway (i.e., a cable) attached to tracked object 12 and processor unit 20, by a RF transmitter like those utilized in remote controls and cordless telephones, . . . etc.

The user input mechanism can also be vision-based. Tracked object 12 may include a button, switch or any type of device which causes a distinguishable mark (i.e., a green dot) on tracked object 12 to become visible, upon a user input. For instance, button 70 can be added onto tracked object 12 to cause a section 72 (FIG. 4B) of tracked object 12, normally located within tracked object 12 and having a distinguishable mark, to extend out to the external surface of tracked object 12 (i.e., using a spring mechanism). In the event of a user input, imaging device 16 registers the image of the mark, as well as that of tracked object 12 and reference points 30, 32. Processor 20 then detects the occurrence of the mark from a current image of tracked object 12 and generates a control signal corresponding to a user input.

Figure 5:
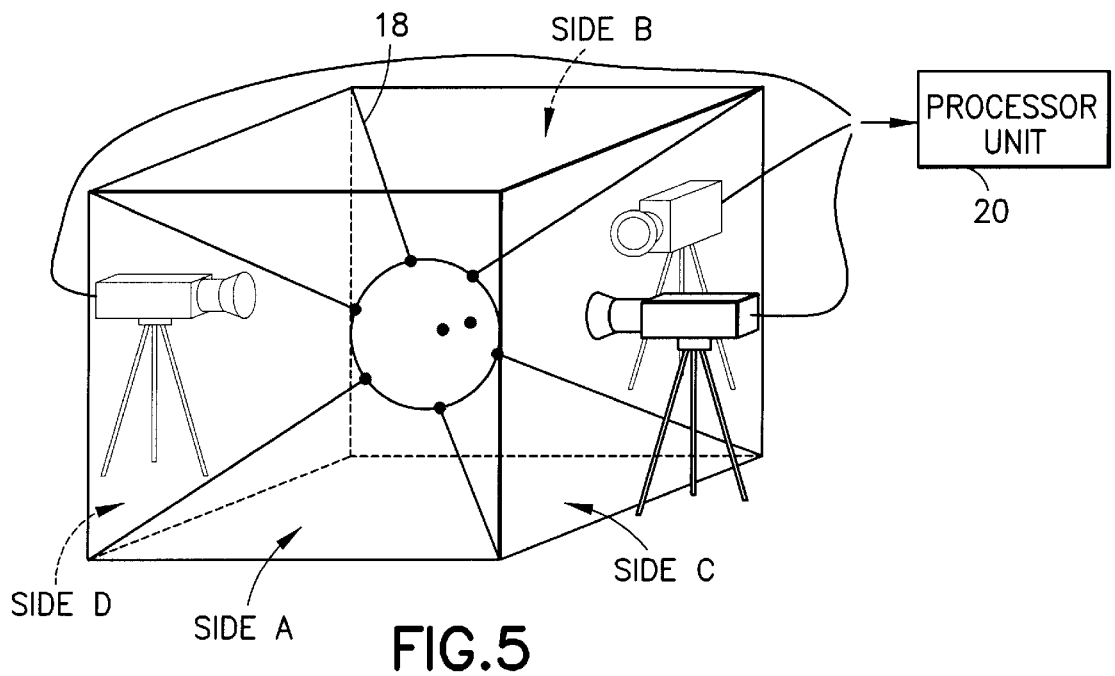
FIG. 5 is a system overview of an input device employing a plurality of imaging devices.

Referring to FIG. 5, another embodiment of VID 10 includes tracked object 12 having multiple reference points systematically positioned thereon and multiple imaging devices. The imaging devices can be calibrated or arranged to provide uniform image data. Each imaging device 16 is positioned relative to corresponding reference points (i.e., two reference points are associated with each imaging device) located about tracked object 12. For instance, similar to the one imaging device scenarios as described above and illustrated in FIG. 1, additional imaging devices (FIG. 5) can be placed at a side C and/or side D to provide images of tracked object 12 and corresponding reference points from different perspectives. As with the one imaging device scenario, the images are transmitted to processor unit 20 to generate translational and rotational control data. Such an arrangement allows for a greater range of tracking and, thus, provides a more reliable tracking feature.

In summary, the present invention provides a low cost and more intuitive 3D/6DoF input device based on visual techniques which utilize a tracked object having two reference points thereon. The input device also provides fast, robust input of full three-dimensional data. The input device can be used to control movement in any virtual reality environment such as flight simulators, virtual reality games, simulated indoor or outdoor tours, planetarium simulators, virtual chat rooms, . . . etc. Such a device can also be used to control mechanical devices, both real and simulated, such as robotic arms, wheelchairs, transport vehicles, mobile robots, . . . etc.

The invention having thus described with particular reference to the preferred forms thereof, it will be obvious that various changes and modifications may be made therein without departing from the spirit and scope of the invention as defined in the appended claims.

We claim:

1. A vision-based controller for providing translational and rotational control data for use by a computer or other input driven device, comprising:

a tracked object, positioned in space and having at least a first reference point and a second reference point, said tracking object capable of three dimensional rotational and translational movement, each reference point having different characteristics, at least one imaging means, positioned at a distance from said tracked object, for generating an image of said tracked object at plural times, each image comprising pixel values, and processor means, responsive to said pixel values from said imaging means, for:

(a) identifying pixels corresponding to a current center of said tracked object, said first reference point and said second reference point and determining a current dimension of said tracked object;

(b) calculating a translational and rotational displacement of said tracked object based on information ascertained in (a), and (c) generating control data in accordance with said transitional and rotational displacement.

2. A controller as recited in claim 1, wherein each of said reference points is distinguished by a different color.

3. A controller as recited in claim 1, wherein said tracked object has multiple reference points systematically positioned thereon, said controller further comprising multiple imaging means, positioned at a distance from respective reference points, for generating image information corresponding to different perspectives of said tracked object.

4. A controller as recited in claim 1, wherein said tracked object further includes input means for receiving an input from a user.

5. A controller as recited in claim 4, wherein said input means, responsive to a user input, causes a distinguishable mark having a particular size, shape or color to appear on said tracked object.

6. A controller as recited in claim 5, wherein said processor means generates a control signal in response to a detection of said distinguishable mark.

7. A controller as recited in claim 1, wherein said tracked object is a ball.

8. A controller as recited in claim 7, wherein said ball has a diameter of approximately 8 centimeters.

9. A controller as recited in claim 1, wherein said first reference point and said second reference point are two dots, each having a diameter of 8 millimeters.

10. A controller as recited in claim 9, wherein a distance between said first reference point and said second reference point is 10 millimeters.

11. A controller as recited in claim 1, wherein said imaging means is a digital camera for generating images of said tracked object.

12. A controller as recited in claim 1, wherein said imaging means includes an analog camera and a frame grabber for digitizing analog outputs from said analog camera.

13. A controller as recited in claim 1, wherein said tracked object is suspended in space by elastic bands coupled between said tracked object and a supporting structure.

14. A controller as recited in claim 1, wherein said control data relates to translational and rotational data associated with a movement of said tracked object.

15. A controller as recited in claim 1, wherein said control data relates to velocity data associated with a movement of said tracked object.

16. A controller as recited in claim 1, wherein said current dimension of said tracked object is a variance of the coordinates of all pixels corresponding to said tracked object.

17. A controller as recited in claim 16, wherein said processor means determines a rotational and translational displacement along an axis of said imaging means based on said current dimension.

18. A controller as recited in claim 17, wherein said current dimension relates to a radius of said tracked object.

* * * * *